US009927961B2

(12) United States Patent
Weskamp

(10) Patent No.: US 9,927,961 B2
(45) Date of Patent: Mar. 27, 2018

(54) VIDEO AD UNIT WITH TIME AND ORIENTATION-BASED PLAYBACK

(71) Applicant: Flipboard, Inc., Palo Alto, CA (US)

(72) Inventor: Marcos A. Weskamp, Palo Alto, CA (US)

(73) Assignee: Flipboard, Inc., Palo Alto, CA (US)

( * ) Notice: Subject to any disclaimer, the term of this patent is extended or adjusted under 35 U.S.C. 154(b) by 176 days.

(21) Appl. No.: 14/593,984

(22) Filed: Jan. 9, 2015

(65) Prior Publication Data

US 2016/0202861 A1    Jul. 14, 2016

(51) Int. Cl.
| | | |
|---|---|---|
| *G06F 3/0484* | (2013.01) | |
| *G11B 27/10* | (2006.01) | |
| *G06Q 30/02* | (2012.01) | |
| *G06F 3/0346* | (2013.01) | |
| *G06F 3/0483* | (2013.01) | |
| *G06F 1/16* | (2006.01) | |

(52) U.S. Cl.
CPC .......... *G06F 3/0484* (2013.01); *G06F 3/0346* (2013.01); *G06F 3/0483* (2013.01); *G06F 3/04842* (2013.01); *G06Q 30/0277* (2013.01); *G11B 27/10* (2013.01); *G06F 1/1694* (2013.01)

(58) Field of Classification Search
CPC .... G06F 3/0484; G06F 3/0346; G06F 3/0483; G06F 3/04842; G06F 1/1694; G06Q 30/0277; G11B 27/10
See application file for complete search history.

(56) References Cited

U.S. PATENT DOCUMENTS

| | | | |
|---|---|---|---|
| 8,718,445 B1 | 5/2014 | Berger et al. | |
| 2006/0061545 A1* | 3/2006 | Hughes | G06F 3/0346 |
| | | | 345/156 |
| 2006/0256133 A1 | 11/2006 | Rosenberg | |
| 2008/0120670 A1* | 5/2008 | Easton | H04N 7/173 |
| | | | 725/115 |

(Continued)

FOREIGN PATENT DOCUMENTS

| | | | |
|---|---|---|---|
| WO | WO 2012/091731 A2 | 7/2012 | |
| WO | WO 2012091731 A2 * | 7/2012 | ......... G06Q 30/0241 |

OTHER PUBLICATIONS

PCT International Search Report and Written Opinion for PCT/US2016/012721, dated Mar. 16, 2016, 10 Pages.

*Primary Examiner* — Nicholas Ulrich
(74) *Attorney, Agent, or Firm* — Fenwick & West LLP

(57) ABSTRACT

An interactive advertisement unit comprises an interactive position-based video portion, and may also include one or more of an introduction ("intro") portion and an exit video portion. The advertisement unit is displayed to the user in response to an impression event, which may be an action performed by the user. Once the impression event is detected, the intro video portion, if included in the interactive advertisement unit, begins playing linearly with respect to time. When intro video portion concludes, the client device displays the interactive position-based video portion of the advertisement. During the display of this interactive position-based video portion, the client device continuously displays an image selected from a video sequence based on the orientation and/or position of the client device. Once the client device detects an exit event, the client device may play the exit video portion linearly with respect to time.

21 Claims, 4 Drawing Sheets

(56) References Cited

U.S. PATENT DOCUMENTS

| | | | |
|---|---|---|---|
| 2009/0187463 A1 | 7/2009 | DaCosta | |
| 2010/0136957 A1* | 6/2010 | Horodezky | G06F 3/017 455/414.2 |
| 2010/0222046 A1* | 9/2010 | Cumming | G06Q 30/02 455/418 |
| 2012/0223884 A1* | 9/2012 | Bi | G06F 1/1694 345/158 |
| 2012/0310588 A1* | 12/2012 | Lee | G06F 1/1694 702/141 |
| 2013/0305286 A1* | 11/2013 | Wassingbo | G06F 17/30849 725/41 |
| 2015/0160853 A1* | 6/2015 | Hwang | G06F 3/04883 715/720 |
| 2015/0221000 A1* | 8/2015 | Cohen-Martin | G06Q 30/02 705/14.73 |
| 2015/0286724 A1* | 10/2015 | Knaapen | H05B 37/029 703/1 |

* cited by examiner

VIDEO AD UNIT WITH TIME AND ORIENTATION-BASED PLAYBACK

BACKGROUND

This invention relates generally to delivery and playback of content to users of an online system, including advertising and video display.

Advertising has proven complicated to implement effectively in mobile device environments because of small display real estate and limited user attention. Different approaches to mobile advertising have been implemented adequately at best. One such implementation is banner advertising. These ad units are flexible in display size, orientation, and location but are often visually ignored in favor of provided content, a concept known as banner blindness. Floating ads, expanding frames, and pop ups are intrusive in part because they interfere with provided content and in part because they are unexpected, nevertheless are quickly dismissed. The time spent interacting with the advertising content is minimal and seldom remembered by users.

Hyperstitial advertisements are full screen advertisements that are displayed before or after an expected content page. This method of deploying ad units strikes a balance between content and advertisements because it does not compete for screen space with content and there is a presumption that an advertisement will occur. Digital magazines that offer users the ability to flip through content pages providing a familiar environment for hyperstitial advertising, as they are digital analogs to their print counterparts where readers expect full page advertising. However, hyperstitial video advertisements are usually not interactive and modestly capture the attention of the targeted user.

SUMMARY

In various embodiments of the invention, a user is presented with an interactive advertisement unit received from an advertisement source. The advertisement unit may be displayed as a hyperstitial advertisement, which is displayed before or after a page of content. For example, the advertisement unit may be displayed between pages of a digital magazine, which is provided on a website or a mobile application providing digital magazine content. The interactive advertisement unit may be displayed as a full screen on the user's device or just within a portion of the display of that device.

In some embodiments, the advertisement unit comprises three portions of video playback: an introduction ("intro") video portion, an interactive position-based video portion, and an exit video portion. However, in some embodiments, one or more of the intro video portion, and the exit video portion are omitted from the advertisement unit; hence, the intro video and the exit video portion are optional components of the advertisement unit. Typically, the intro video portion, interactive position-based video portion, and exit video portion are three consecutive segments of a single video sequence, whereby the display and playback of the advertisement in accordance with embodiments of the invention provides the user with a unique viewing experience for consuming the video content in connection with the advertisement.

In one embodiment, the advertisement unit is displayed to the user in response to an impression event, which is a trigger that causes the advertisement to begin. The impression event may comprise an action performed by the user, such as a page turn in the digital magazine or a user selection of an advertisement thumbnail. In some embodiments, when the impression event is detected, the intro video portion begins playing linearly with respect to time. This time-based video of the intro portion plays through its entirety on the display of the client device. At the conclusion of the intro video portion, the client device displays the interactive position-based video portion of the advertisement. In other embodiments, the interactive position-based video portion of the advertisement begins playing when the impression event is detected. During the display of this interactive position-based video portion, the client device continuously updates and displays video frames selected from a video sequence based on linear orientation and/or position of the client device. For example, the user can adjust the linear orientation of the client device as a way of manually stepping forward or stepping backward (i.e., scrubbing) in a video sequence within the interactive position-based video portion. At some point during the display of the interactive position-based video portion, the client device detects an exit event. As with the impression event, the exit event may be an action performed by the user, such as a page turn in the digital magazine environment. Upon detection of the exit event, the client device may play the optional exit video portion linearly with respect to time in some embodiments then return to the digital magazine content. Alternatively, when the exit event is detected, the client device returns to the digital magazine content from the interactive position-based video portion.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

Overview

A digital magazine server retrieves content from one or more sources and generates a personalized, customizable digital magazine for a user based on the retrieved content. The generated digital magazine is retrieved by a digital magazine application executing on a computing device (such as a mobile communication device, tablet, computer, or any other suitable computing system) and presented to the user. For example, based on selections made by the user and/or on behalf of the user, the digital server application generates a digital magazine including one or more sections including content items retrieved from a number of sources and personalized for the user. The generated digital magazine allows the user to more easily consume content that interests and inspires the user by presenting content items in an easily navigable interface via a computing device.

The digital magazine may be organized into a number of sections that each include content having a common characteristic (e.g., content obtained from a particular source). For example, a section of the digital magazine includes articles from an online news source (such as a website for a news organization), another section includes articles from a third-party-curated collection of content associated with a particular topic (e.g., a technology compilation), and an additional section includes content obtained from one or more accounts associated with the user and maintained by one or more social networking systems. For purposes of illustration, content may include textual articles, pictures, videos, products for sale, user-generated content (e.g., content posted on a social networking system), advertisements, and any other types of content capable of display within the context of a digital magazine.

System Architecture

Figure 1:
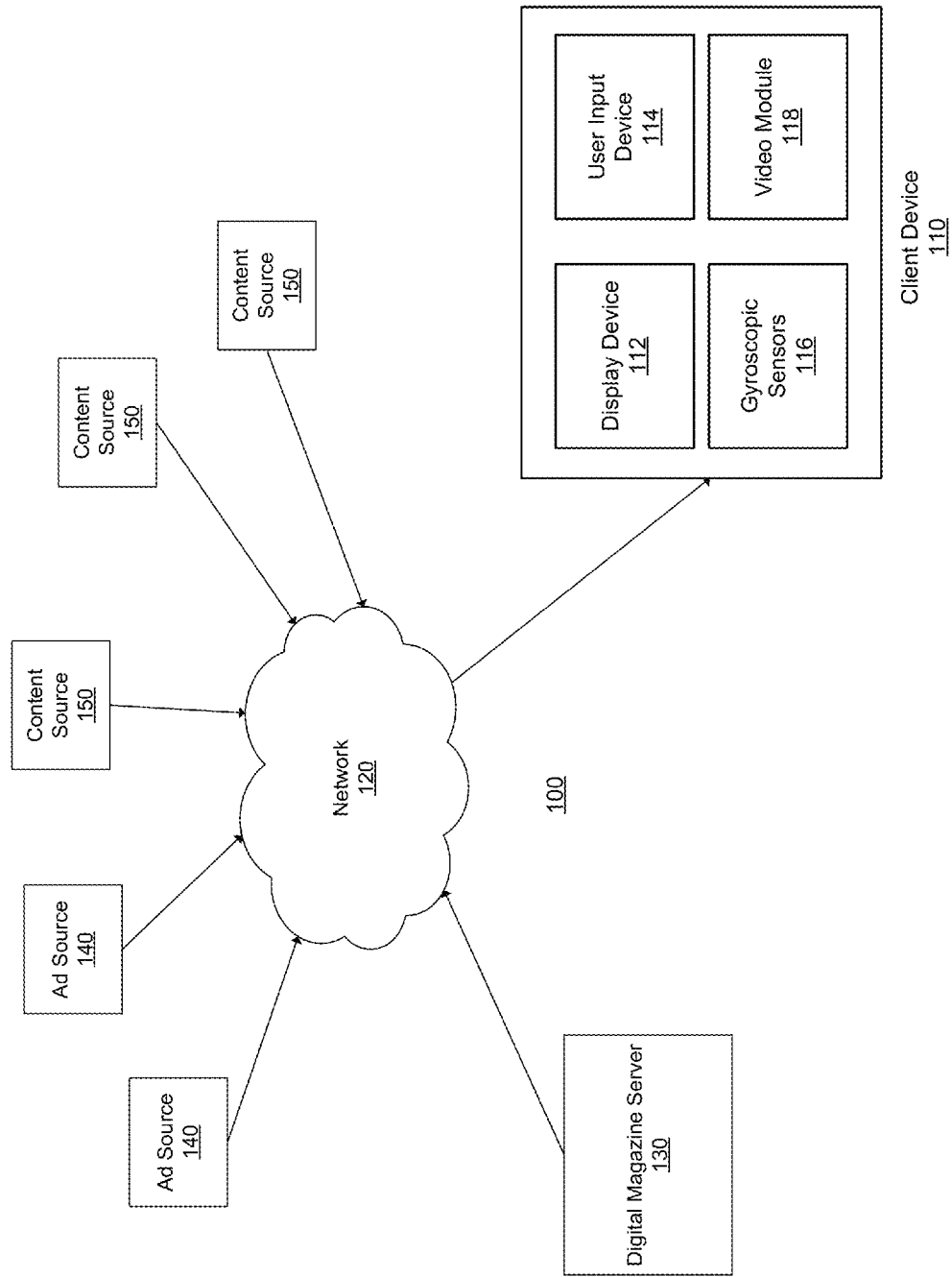
FIG. 1 is a functional architecture diagram of system for providing an interactive advertisement to a user, according to an embodiment.

FIG. 1 is a block diagram of a system environment 100 for a digital magazine server 130. The system environment 100 shown by FIG. 1 comprises one or more advertisement sources 140, one or more content sources 150, a network 120, a client device 110, and the digital magazine server 130. In alternative configurations, different and/or additional components may be included in the system environment 100. The embodiments described herein can be adapted to online systems that are not digital magazine severs 130.

An advertisement sources 140 or content sources 150 are computing systems capable of providing various types of content to a client device 110. Advertisement sources 140 provide advertisement content that is incorporated into digital magazines. They may include audio, video, images, or text that take the form of hyperstitial or interstitial advertisements. Examples of content provided by content sources 150 include text, images, video, or audio on web pages, web feeds, social networking information, messages, or other suitable data. Additional examples of content include user-generated content such as blogs, tweets, shared images, video or audio, social networking posts, and social networking status updates. Content provided by a content source 150 may be received from a publisher (e.g., stories about news events, product information, entertainment, or educational material) and distributed by the content source 150, or a source may be a publisher of content it generates. A content item, regardless of source, may include various types of content, such as text, images, and video.

The advertisement sources 140 and/or content sources 150 communicate with the client device 110 and the digital magazine server 130 via the network 120, which may comprise any combination of local area and/or wide area networks, using both wired and/or wireless communication systems. In one embodiment, the network 120 uses standard communications technologies and/or protocols. For example, the network 120 includes communication links using technologies such as Ethernet, 802.11, worldwide interoperability for microwave access (WiMAX), 3G, 4G, code division multiple access (CDMA), digital subscriber line (DSL), etc. Examples of networking protocols used for communicating via the network 120 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network 120 may be represented using any suitable format, such as hypertext markup language (HTML), extensible markup language (XML), or JavaScript Object Notation (JSON). In some embodiments, all or some of the communication links of the network 120 may be encrypted using any suitable technique or techniques.

The digital magazine server 130 receives advertisement or content items from one or more advertisement sources 140 and/or content sources 150. It generates pages in a digital magazine by processing the received content, and provides the pages to the client device 110. The digital magazine server 130 generates one or more pages for presentation to a user based on advertisement or content items obtained from one or more advertising sources 140 or content sources 150 and information describing organization and presentation of advertising or content items. For example, the digital magazine server 130 determines a page layout specifying positioning of content items relative to each other based on information associated with a user and generates a page including the content items arranged according to the determined layout for presentation to the user via the client device 110. This allows the user to access content items via the client device 110 in a format that enhances the user's interaction with and consumption of the content items. Between one or more pages of content items presented, the digital magazine server may place advertisement items. For example, the digital magazine server 130 provides a user with content items in a format similar to the format used by print magazines. In keeping with print magazines, once a user has flipped through one or more pages of content items a full page interstitial advertisement may occur. By presenting advertisement and content items in a format similar to a print magazine, the digital magazine server 130 allows a user to interact with items from multiple sources via the client device 110 with less inconvenience from horizontally or vertically scrolling to access various content items.

The client device 110 is one or more computing devices capable of receiving user input as well as transmitting and/or receiving data via the network 120. In one embodiment, the client device 110 is a conventional computer system, such as a desktop or a laptop computer. Alternatively, the client device 110 may be a device having computer functionality, such as a personal digital assistant (PDA), a mobile telephone, a smartphone or another suitable device. In one embodiment, the client device 110 executes an application allowing a user of the client device 110 to interact with the digital magazine server 130. For example, an application executing on the client device 110 communicates instructions or requests for content items to the digital magazine server 130 to modify content presented to a user of the client device 110. As another example, the client device 110 executes a browser that receives pages from the digital magazine server 130 and presents the pages to a user of the client device 110. In another embodiment, the client device 110 interacts with the digital magazine server 130 through an application programming interface (API) running on a native operating system of the client device 110, such as IOS® or ANDROID™. While FIG. 1 shows a single client device 110, in various embodiments, any number of client devices 110 may communicate with the digital magazine server 130.

A display device 112 included in the client device 110, it presents content items to a user of the client device 110. Examples of the display device 112 include a liquid crystal display (LCD), an organic light emitting diode (OLED) display, an active matrix liquid crystal display (AMLCD), or any other suitable device. Different client devices 110 may have display devices 112 with different characteristics. For example, different client devices 110 have display devices 112 with different display areas, different resolutions, or differences in other characteristics.

One or more user input devices 114 included in the client device 110 receive input from the user. Different user input devices 114 may be included in the client device 110. For example, the client device 110 includes a touch-sensitive display for receiving input data, commands, or information from a user. Using a touch-sensitive display allows the client device 110 to combine the display device 112 and a user input device 114, simplifying user interaction with presented content items. In other embodiments, the client device 110 may include a keyboard, a trackpad, a mouse, or any other device capable of receiving input from a user. In another example, the user input device 114 is configured to receive information from a user of the client device 110 through a touchless interface. Examples of a touchless interface include sensors, such as an image capture device, to receive gestures from a client device user without the user physically contacting the display device 112 or the client device 110. Additionally, the client device 110 may include multiple user input devices 114 in some embodiments. Inputs received via the user input device 114 may be processed by a digital magazine application associated with the digital magazine server 130 and executing on the client device 110 to allow a client device user to interact with content items presented by the digital magazine server 130.

Gyroscopic sensors 116 determine a set of rotation measurements of the client device 110. The gyroscopic sensors 116 provide an indication of the gyroscopic rotation of the sensors, and generally of the client device 110. In one embodiment, the gyroscopic sensors 116 directly sense rotational measurements such as pitch, roll, and yaw. In alternate embodiments, the gyroscopic sensors 116 are accelerometers that determine angular acceleration of the client device 110, which is integrated to determine the rotational measurement from a reference orientation. The orientation of the client device 110 is termed the device orientation. The raw rotation measurements are converted to the device orientation by determining the orientation of the device relative to an initialized orientation termed a "reference orientation." The reference orientation may be determined by the gyroscopic sensors 116 when the gyroscopic sensors 116 are initialized, or the reference orientation may be determined by the video module 118. The rotation of the device from the reference point is termed the device rotation.

A sequence of interactive position-based video frames is received from the advertising sources 140 via the network 120 and stored by a video module 118. In some embodiments, an intro video portion, an exit video portion, or an intro video portion and an exit video portion are received from the advertising sources 140 along with the sequence of interactive position-based video frames; hence, the intro video portion and the exit video portion are optional. The optional intro and exit video segments are transmitted for playback by the video module 118 with respect to time on the display device 112. The interactive position-based video frame sequence is displayed as a function of the client device's orientation, as opposed to time. The frames of the interactive position-based video frame sequence are mapped to a linear range of motion of the client device 110 before transmitted to the display device 112. In one embodiment, the sequence of interactive position-based video frames is mapped to a linear range of rotation about an axis that runs perpendicular to the horizontal resolution of the display device 112. In another embodiment, the sequence is mapped to a linear range of rotation about an axis that runs perpendicular to the vertical resolution of the display device 112. As the client device 110 is rotated about either axis, through the linear range of rotation, the sequence of interactive video frames are displayed on the display device 112 with respect to the reference orientation. The interactive position-based video may be sequenced as the client device 110 is rotated about the axis in one direction and reversed as the client device 110 is rolled in the other direction. In yet another embodiment, the interactive position based video sequence may be mapped to a plane formed by the horizontal and vertical resolution of the display device 112 such that when the client device 110 is yawed in the plane, the video sequences in one direction with respect to the reference orientation. When the direction of yaw is reversed the video sequences in the opposite direction. In a further embodiment, the video sequence may be mapped to an axis the runs orthogonal to a plane formed by the horizontal and vertical resolution of the display device 112. The sequence of video frames may include any number of video frames, densely or sparsely, covering the linear range of motion.

The mapping of the interactive position-based video frames to a linear range of motion is determined by the video module 118 with linear degree measurements transmitted from the gyroscopic sensors 113 and accelerometers. If not provided by the gyroscopic sensors 116, the video module 118 determines the linear motion relative to the reference orientation. An initial linear position is used to calibrate a reference orientation of the client device 110. The initial linear position calibrates the reference orientation and is used to map video frames from the interactive position-based video to ranges of linear motion. With a reference orientation established, the client device 110 may be rotated or moved in either direction while the video module 118 tracks the movement through the respective linear range motion. The range of motion in which the client device 118 can be progress in either linear direction typically has a maximum limit. The tracked movement through the linear range of motion causes the video module 118 to send the corresponding mapped sequence of video frames to the display device 112 until the maxim range of motion limit has been reached. For example, a sequence of video frames typically cover a specified linear rotational range, such as [−45°, +45°], with frames associated with each nine degree change in the range. Thus, in some embodiments, a video frame may indicate a 9° rotation relative to a reference orientation using nine video frames for the range of [−45°, +45°].

Time and Position-Based Advertisement

Figure 2:
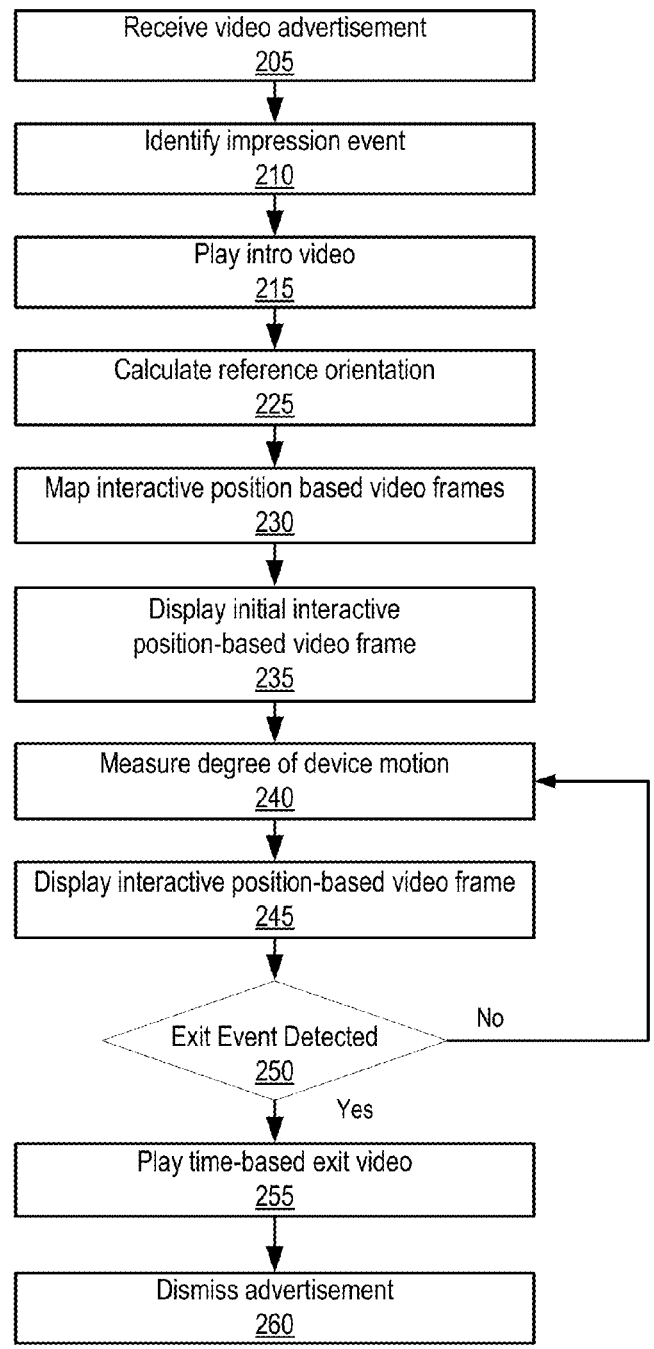
FIG. 2 is a flowchart of a method for displaying an interactive advertisement to a user, according to an embodiment.
Figure 3:
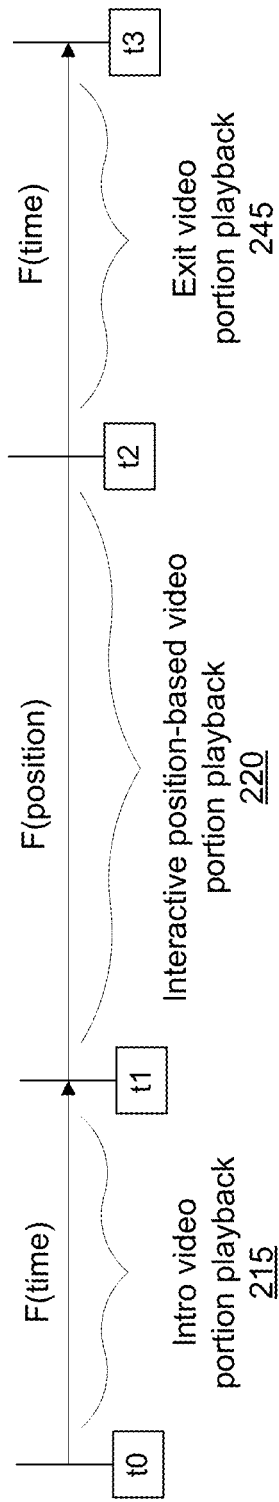
FIG. 3 is a timeline of an example interactive advertisement that contains a first intro video time-based portion, a second interactive position-based portion, and a third exit time-based video portion.
Figure 4:
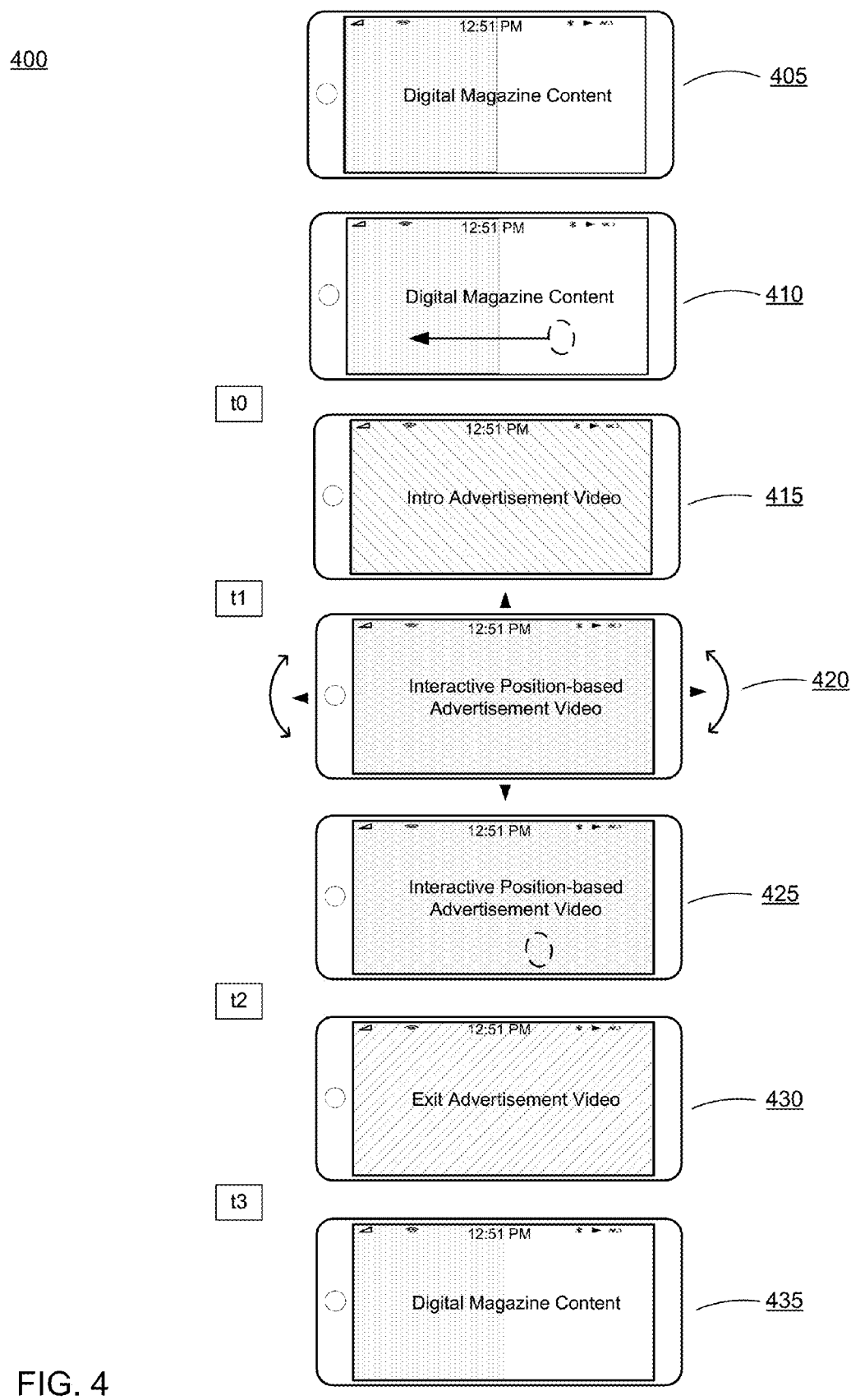
FIG. 4 is a state diagram of an interactive advertisement video sequence that contains a first time-based intro video portion, a second interactive position-based portion, and a third time-based exit video portion.

FIGS. 2, 3, and 4 illustrate an interactive advertisement that comprises displaying to a user a first intro video portion 215, a second interactive position-based video portion 220, and third exit video portion 245. In other embodiments, the interactive advertisement does not include the first intro video portion 215 and/or the third exit video portion 245. Hence, the first intro video portion 215 and the third exit video portion 245 are optional in various embodiments.

The advertisement unit is transmitted over a network 120 received 205 by the client device 110 and received and stored by the video module 118 until an impression event is identified 210 by a user input device 114. An impression event 410 can occur while browsing through digital magazine content and is an action that causes a transition from digital magazine content to a playback of the interactive advertisement video. The impression event 410 may be user initiated through user touchscreen gestures such as a finger swipes (shown in FIG. 4) that turn a digital magazine page, a touch of an embedded advertisement thumbnail, or touch that exits the digital magazine application. Impression events 410 are not necessarily limited to user-initiated actions; they may occur after a predetermined time period digital magazine content browsing. Once an impression event 410 is identified 210 by the user input device 114, in some embodiments, the video module 118 transmits an intro video portion 415 to the device display 112 for playback 215. The first intro video 415 plays linearly with respect to time at t(0), as shown in FIG. 3 and FIG. 4, until the video segment is exhausted at time t(1). However, in other embodiments, the intro video portion 415 is not displayed when the impression event is identified, but a reference orientation 225 of the client device 110 is determined and the interactive position-based video frames 420 are mapped 230 as further described below.

Once playback 215 of the optional intro video 415 is complete, the gyroscopic sensors 116 calculate a reference orientation 225 of the client device 110 then transmits the result to the video module 118. The video module 118 maps 230 the interactive position-based video frames 420 using the reference orientation as an initial linear point. With the reference orientation calculated 225, the video module 118 transmits the initial position-based video frame 420 to display 235 on the display device 112. If the device is rotated about an axis that runs perpendicular to either the vertical or horizontal resolution, the gyroscopic sensors measure 240 the degree of motion rolled and send the results the video module 118. The video module 118 identifies the corresponding video frames and transmits them to the display device 112 for display 245. As the client device 110 is rolled about the axis this process repeats, sequencing video frames in either direction based on the reference orientation. The interactive position-based video plays indefinitely until an exit event 425 is identified 250, shown in FIG. 3 and FIG. 4, at time t(2).

A user-initiated exit event 425, detected 250 by the user input device 114, causes the interactive position-based video playback 420 to end. The exit event 425 is an action that initiates a transition from the interactive advertisement video back to the digital magazine content. As with the impression event 410, the exit event 420 may be user initiated through user touchscreen gestures such as a finger swipes or a touch to the user input device 114. Since an advertiser may prefer that the user interact with the ad unit as long as possible, exit events 425 may often be user-initiated. In some embodiments, once the exit event 425 is detected 250, the video module 118 transmits the exit video 430 portion to the device display 112 for playback 255 with respect to time. When the time-based exit video 430 portion has played through in its entirety, as shown in FIG. 3, at t(3) the advertisement is dismissed 260, and the digital magazine content 430 returns to the display device 112, as shown in FIG. 4. However, in other embodiments, the time-based exit video 430 portion is not displayed and the advertisement is dismissed 260 when the exit event 425 is detected 250.

In various embodiments, the video module 118 is located at a remote server in communication with the client device 110. Accordingly, certain steps are performed at the server in these embodiments. For example, the orientation of the device may be transmitted to the remote server, which maps the interactive position-based video frames and transmits them to the client device 110 for display to the user.

SUMMARY

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the invention may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A computer program product for providing advertising to users of an online system, the computer program product comprising a non-transitory computer-readable storage medium containing computer program code for:
   receiving an advertisement, the advertisement including a video portion comprising a series of video frames;
   identifying an impression event for displaying the received advertisement on a client device;
   responsive to the impression event:

calculating a reference position of the client device based on an initial position received from a position detector of the client device, and displaying a sequence of frames of the series of video frames and continually updating the displayed sequence of frames on the client device, the displayed sequence of frames selected by:

receiving an indication of a current position of the client device from the position detector of the client device, selecting a sequence of frames from the series of the video frames, the sequence of frames selected based on an orientation of the current position of the client device relative to the reference position, and displaying the selected sequence of frames on the client device as the displayed sequence of frames and identifying an exit event for dismissing the advertisement from the client device.

2. The computer program product of claim 1, wherein the impression event comprises a user input that causes a page turn of a digital magazine.

3. The computer program product of claim 1, wherein the impression event comprises a user selection of an advertisement thumbnail.

4. The computer program product of claim 1, the computer program product further comprising computer program code for playing a first segment of video frames of the video portion responsive to the impression event and prior to continually updating the displayed sequence of frames of the series of video frames on the client device.

5. The computer program product of claim 4, wherein the first sequence of frames of the series of video frames is played linearly with respect to time.

6. The computer program product of claim 4, wherein the displayed sequence of frames of the series of video frames is selected from a second segment of video frames of the video portion, and the computer program product further contains computer program code for playing a third segment of video frames of the video portion responsive to the exit event.

7. The computer program product of claim 6, wherein the third segment of video frames of the video portion of the series of video frames is played linearly with respect to time.

8. The computer program product of claim 6, wherein the first, second, and third segments of the video frames of the video portion are consecutive segments of the advertisement.

9. The computer program product of claim 6, wherein the advertisement includes a visual representation of a first impression event within the video frames of the first segment of the video portion that transitions to the second segment of the video portion when an interaction with the advertisement is received and a visual representation of a second impression event within the video frames of the second segment of the video portion that transitions to the third segments of the video portion when another interaction with the advertisement is received.

10. The computer program product of claim 1, wherein the computer program product further comprising computer program code for:

responsive to the orientation of the current position of the client device indicating stepping forward through the series of video frames of the received advertisement, selecting a sequence of frames from the series of the video frames of the video portion corresponding to the orientation of the current position of the client device with respect to the reference position of the client device.

11. The computer program product of claim 1, wherein the computer program product further comprising computer program code for:

responsive to receiving the reference position of the client device, mapping a plurality of orientations of the client device to the video frames of the advertisement with respect to the reference position of the client device.

12. A computer program product for providing advertising to users of an online system, the computer program product comprising a non-transitory computer-readable storage medium containing computer program code for:

receiving an advertisement, the advertisement including a video portion comprising a series of video frames;

identifying an impression event for displaying the received advertisement on a client device; and responsive to the impression event:

calculating a reference position of the client device based on an initial position received from a position detector of the client device, and continually displaying a sequence of frames of the series of video frames on the client device, the displayed sequence of frames selected based on the reference position and an orientation of a current position of the client device.

13. The computer program product of claim 12, the computer-readable storage medium further containing computer program code for playing a first segment of the series of video frames of the video portion linearly with respect to time responsive to the impression event and prior to displaying the selected sequence of frames of the series of video frames on the client device.

14. The computer program product of claim 13, wherein the displayed frames are selected from a second segment of the series of video frames of the video portion, and the computer-readable storage medium further contains computer program code for:

identifying an exit event;

responsive to the exit event, playing a third segment of the series of video frames of the video portion linearly with respect to time; and dismissing the advertisement after the third segment of the series of video frames of the video portion of the video has been played.

15. The computer program product of claim 14, wherein the exit event comprises a user input dismissing the advertisement from the client device.

16. A method for advertising to users of an online system, the method comprising: selecting an advertisement to be displayed on the client device; and sending the selected advertisement to the client device, wherein the advertisement includes:

a video portion including a series of video frames divided into first, second, and third segments; and instructions for causing the client device to:

responsive to an impression event, play a first segment of the series of video frames linearly with respect to time, receive a reference position of the client device from a position detector of the client device, after the playing of the first segment of the series of video frames of the video portion, display a sequence of frames of the video frames of the video portion on the client device from the second segment of the video frames of the video portion, the displayed sequence of frames selected based on the reference position and an orientation of a current position of the client device, and responsive to an exit event, play a third segment of the video frames of the video portion linearly with respect to time.

17. The method of claim 16, wherein the impression event comprises a user input that causes a page turn of a digital magazine displayed by the client device.

18. The method of claim 16, wherein the impression event comprises a user selection of an advertisement thumbnail.

19. The method of claim 16, wherein the selected advertisement includes a visual representation for a first impression event within the video frames of the first segment of the video portion that transitions to the second segments of the video portion when an interaction with the advertisement is received and a visual representation for a second impression event within the video frames of the second segment of the video portion that transition to the third segments of the video portion when another interaction with the advertisement is received.

20. The method of claim 16, wherein the advertisement further comprises instructions for causing the client device to:

responsive to the current position of the client device indicating stepping forward through the series of video frames of the advertisement, select a frame from the series of the video frames corresponding to the orientation of the current position of the client device with respect to the reference position of the client device.

21. The method of claim 16, wherein the advertisement further comprises instructions for causing the client device to:

responsive to receiving the reference position of the client device, map a plurality of orientations of the client device to the video frames of the advertisement with respect to the reference position of the client device.

* * * * *

UNITED STATES PATENT AND TRADEMARK OFFICE
CERTIFICATE OF CORRECTION

PATENT NO. : 9,927,961 B2
APPLICATION NO. : 14/593984
DATED : March 27, 2018
INVENTOR(S) : Marcos A. Weskamp Page 1 of 1

It is certified that error appears in the above-identified patent and that said Letters Patent is hereby corrected as shown below:

On the Title Page

Item (57) Abstract section, Line 9, after "time. When" insert -- the --.

In the Claims

Column 9, Line 58, after "third" delete "segments" and insert -- segment --.
Column 11, Lines 16-17, after "to the second" delete "segments" and insert -- segment --.
Column 12, Lines 1-2, after "to the third" delete "segments" and insert -- segment --.

Signed and Sealed this
Twenty-third Day of April, 2019

Andrei Iancu
*Director of the United States Patent and Trademark Office*